No. 625,377. Patented May 23, 1899.
M. E. & C. C. BLOOD.
VELOCIPEDE AND CARRIER.
(Application filed Mar. 8, 1897.)
(No Model.) 3 Sheets—Sheet 1.
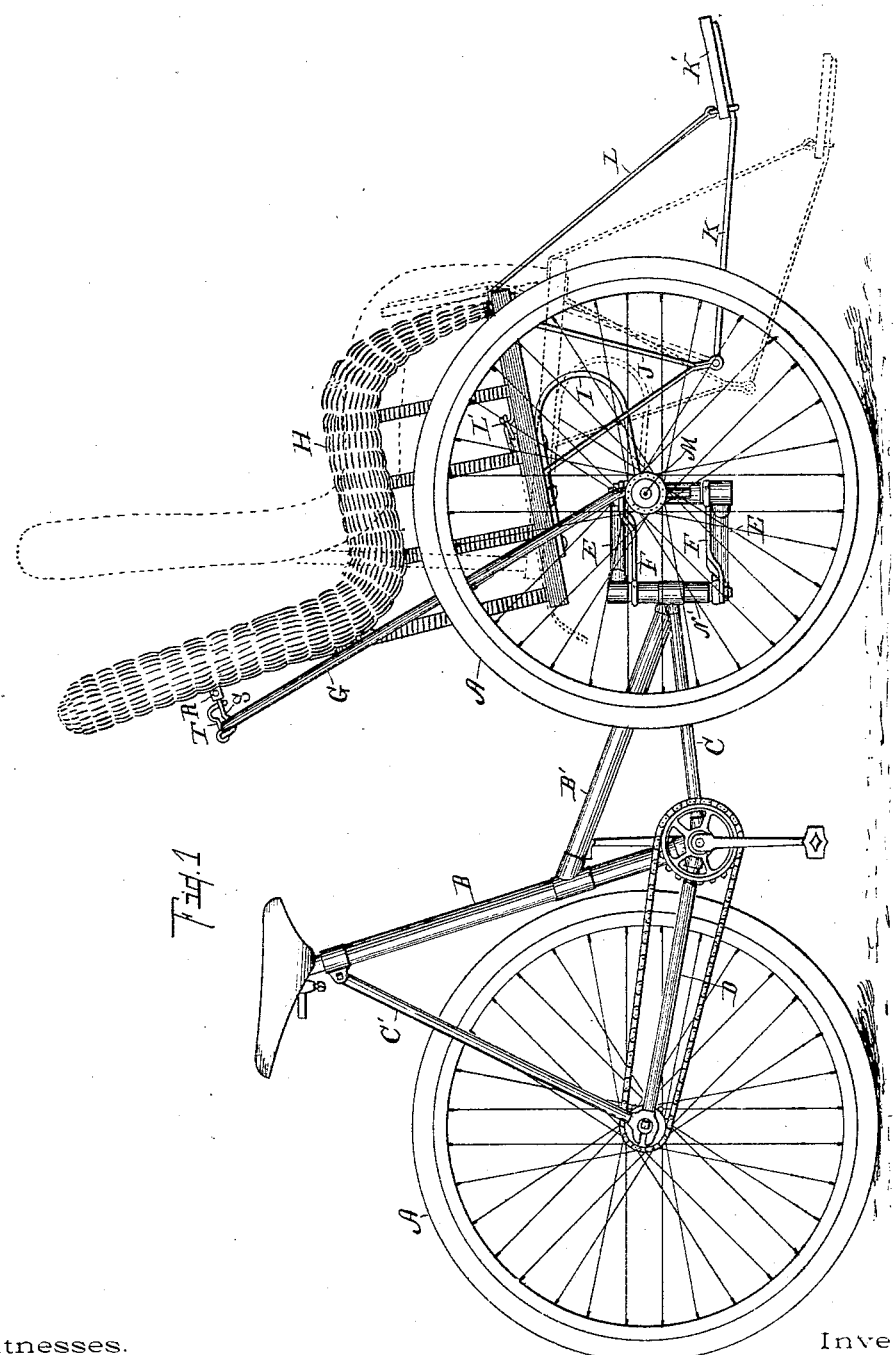
Witnesses.
W. S. Wood
V. E. Chappell
Inventors.
Maurice E. Blood
Clarence C. Blood
By Fred L. Chappell
Attorney.

No. 625,377. Patented May 23, 1899.
M. E. & C. C. BLOOD.
VELOCIPEDE AND CARRIER.
(Application filed Mar. 8, 1897.)
(No Model.) 3 Sheets—Sheet 2.
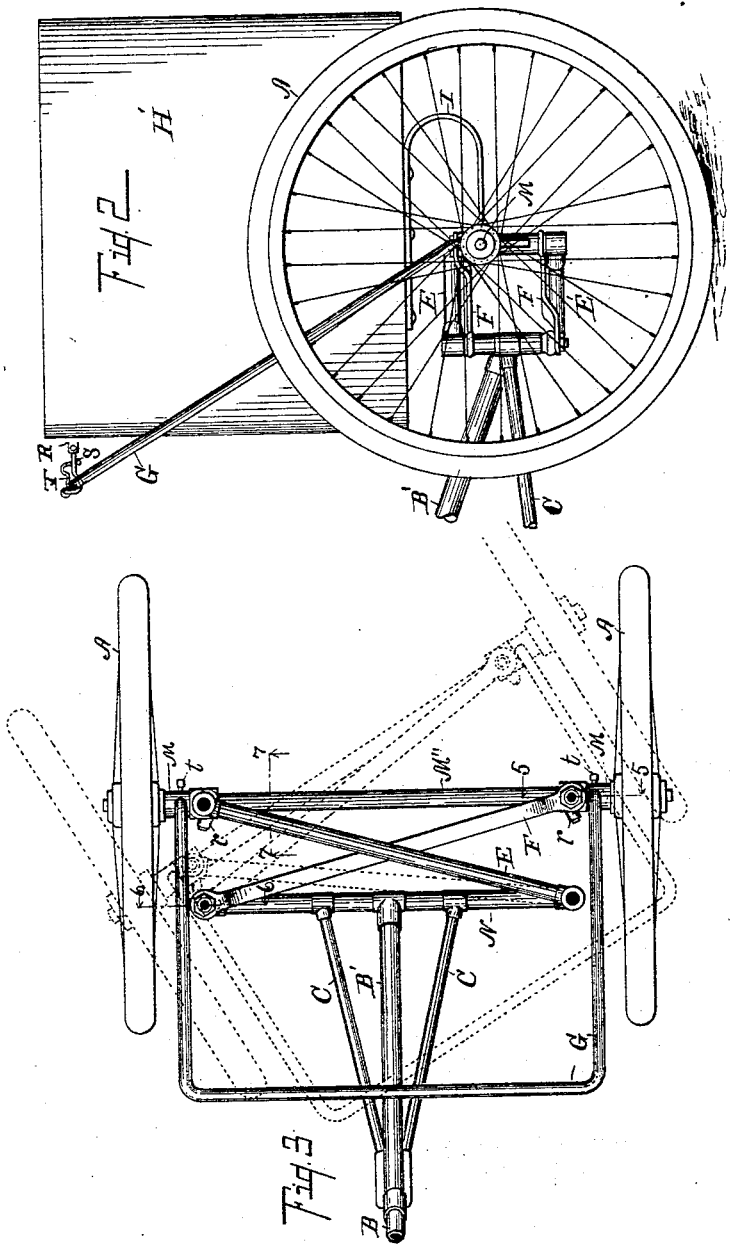
Witnesses.
W. S. Wood
V. E. Chappell.
Inventor.
Maurice E. Blood 2d
Clarence C. Blood
By Fred L. Chappell
Attorney.
THE NORRIS PETERS CO., PHOTO-LITHO., WASHINGTON, D. C.

No. 625,377. Patented May 23, 1899.
M. E. & C. C. BLOOD.
VELOCIPEDE AND CARRIER.
(Application filed Mar. 8, 1897.)
(No Model.) 3 Sheets—Sheet 3.
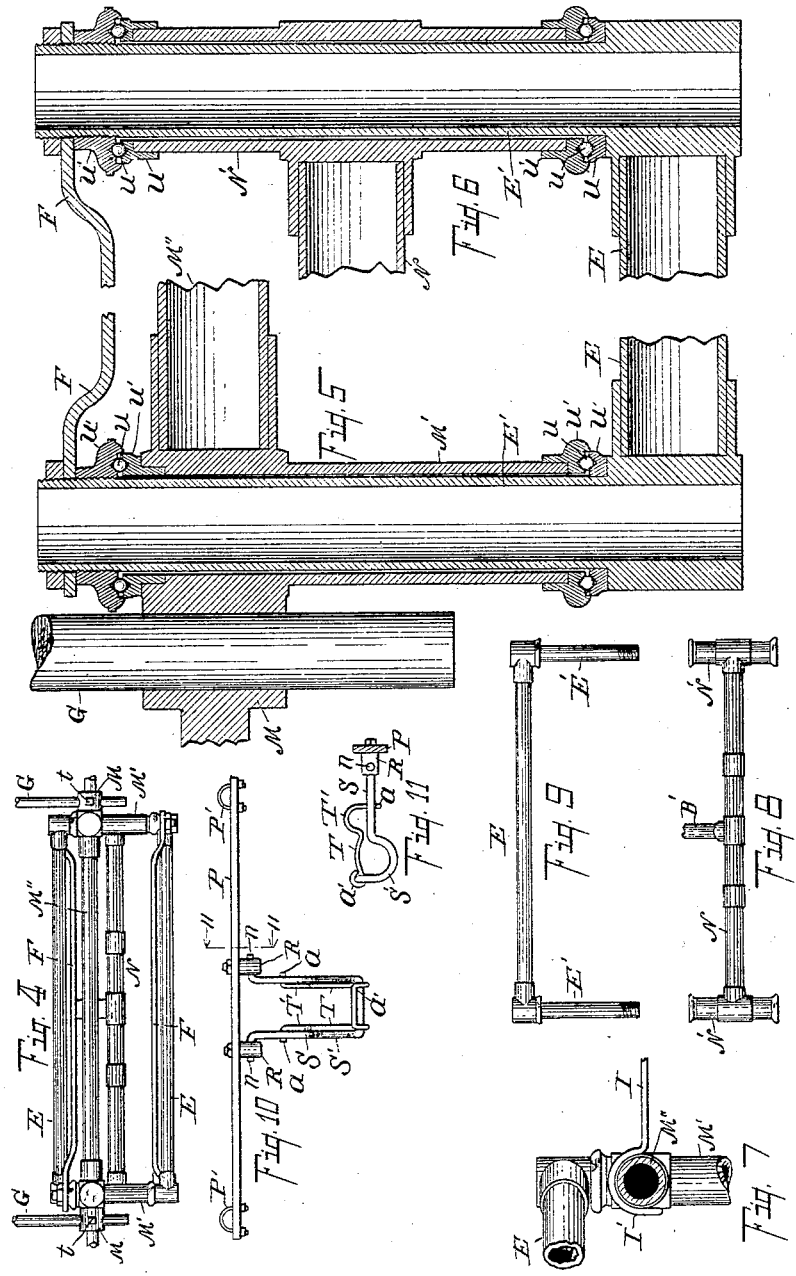
Witnesses.
Inventors
Attorney.

UNITED STATES PATENT OFFICE.

MAURICE E. BLOOD AND CLARENCE C. BLOOD, OF KALAMAZOO, MICHIGAN, ASSIGNORS TO THE KALAMAZOO CYCLE COMPANY, OF SAME PLACE.

VELOCIPEDE AND CARRIER.

SPECIFICATION forming part of Letters Patent No. 625,377, dated May 23, 1899.

Application filed March 8, 1897. Serial No. 626,502. (No model.)

*To all whom it may concern:*

Be it known that we, MAURICE E. BLOOD and CLARENCE C. BLOOD, citizens of the United States, residing at the city of Kalamazoo, in the county of Kalamazoo and State of Michigan, have invented a certain new and useful Velocipede and Carrier, of which the following is a specification.

This invention relates to improvements in velocipedes and similar vehicles which are self-propelling.

The objects of this invention are, first, to provide for a vehicle having three or more ground-wheels a device that will allow perfect freedom to the steering-wheels while they are being turned out of a straightforward direction, so that one wheel will not crowd or cramp another; second, to provide a pivotal connection between the steering-wheels and the remainder of the vehicle that will allow the steering to be done with the least possible friction; third, to provide a vehicle that will be partially or wholly self-steering when going in a straightforward direction; fourth, to provide a device for steering that will allow the steering-wheels to pass over obstructions in the road with the least possible disarranging of the steering or jolting of the vehicle and load; fifth, to provide a gearing and framework for vehicles having three or more wheels that will be adapted to support and carry a box for carrying loads or a supplementary seat for carrying persons and make the same as light and compact as possible; sixth, to provide a body, either a seat or box, that can be quickly and easily attached or detached; seventh, to provide a vehicle and chair especially well adapted for use together that shall be a great convenience, especially for invalids and other feeble persons, and further objects appearing in the detailed description. I accomplish these objects by the devices and means described in the following specification, definitely pointed out in the claims, and illustrated in the accompanying drawings, in which—

Figure 1 is a side elevation showing a three-wheeled vehicle with a body consisting of a specially-constructed chair for carrying a person. Fig. 2 is a detail side elevation of the front portion of the vehicle, showing the body consisting of a box for carrying parcels, luggage, or any load required. Fig. 3 is a detail plan view of the front part of the vehicle with the body removed, showing the steering mechanism, the dotted lines showing its relative position in steering. Fig. 4 is a detail front elevation of the steering mechanism appearing in Fig. 3, with the wheels and the handle-bar broken away. Fig. 5 is an enlarged detail sectional elevation, taken on line 5 5 of Fig. 3, showing the structure of one of the forward joints of the transverse arms in the steering mechanism and the attachment of the handle-bar. Fig. 6 is an enlarged detail sectional elevation, taken on line 6 6 of Fig. 3, showing the structure of one of the rear joints of the transverse arms in the steering mechanism. Fig. 7 is an enlarged detail sectional elevation, taken on line 7 7 of Fig. 3, showing relative parts and the means of supporting the body of the vehicle by its spring. Fig. 8 is a detail view of the cross-bar N to the front of the rear portion of the vehicle and adjacent parts, the reach B being shown broken. Fig. 9 is a detail view of one of the cross-bars E, showing the journals E' E' at right angles thereto at each end. Fig. 10 is a detail plan view of the means of attaching the body to the handle-bar. Fig. 11 is a detail sectional elevation taken on line 11 11 of Fig. 10.

In the drawings all of the sectional views are taken looking in the direction of the little arrows at the ends of the section-lines, and similar letters of reference refer to similar parts throughout the several views.

Referring to the lettered parts of the drawings, A A' represent the carrying-wheels of the velocipede. The wheel A is the rear and also the driving wheel, and the forward wheels A' A' are the steering-wheels.

The frame to the rear consists of a hollow post or down tube B, with a rear fork D and braces C' extending from the top of the post B down to the rear, like the construction of the rear portion of a safety-bicycle. The saddle is mounted in the usual position on the top of the post B. The cranks and their hanger, located in the usual position, along with the usual sprocket-wheels and chains, make up the driving or propelling mechanism. A reach B' extends from the post B downwardly and forwardly and connects to a cross tube or bar N, and is suitably braced by braces C on each side. At each end of the bar N are cross arms or tubes N' N', vertical in position, which serve as journals for the connecting-bars that join this rear section of the machine to the forward section.

The forward wheels of the velocipede are carried on the ends of the axle, which is made up of tube M" and forged blocks M at each end, by suitable ball-bearings, like those of the forward wheel of a safety-bicycle. In the solid ends M of the axle are inserted tubes M' to serve as bearings for the journals E' E' of the cross-arms E. These journals E' E' are at right angles to each end of the arm or bar E and are adapted to insert into a tube M' at one end and into the tube N' on the opposite end of the cross-piece N. A straight bar F is secured on the ends of the journals E' to form a hinged frame in connection with the bar E and its journals. Suitable ball-races $u'$ are placed on the ends of the tubes forming the journal-bearing, with antifriction-balls $u$ therein, so the arms E and F and the journals E' will be retained in a fixed frame hinging the front and rear sections of the vehicle together from opposite sides. The manner of joining the journals E' to the tubes N' and M' is similar to the joining of the front fork in the head of a safety-bicycle, the ball-bearings being located in the same manner or in any other way. There is an arm E connecting at the right-hand end of the cross-piece N and extending over to the left-hand end of the axle M", the journals E' of which are inserted down through the tube N' and M'. A bar F is at the bottom of the journals and connects the same together and so forms a strong connection. From the left-hand end of the bar N to the right-hand end of the axle M" there is a similar bar E, that has its journals E' inserted up through the journals M' and N' at those points, as clearly appears in Figs. 5 and 6, and a bar F connects the top end of the journals and is curved down from these to turn under the top bar E. The bars E cross each other somewhat in the manner of the letter X, as clearly appears in Fig. 3, so that they permit the swinging of the forward section from side to side, as clearly appears in Fig. 3. In practice it is found that the tendency of this vehicle is to move in a straight line, owing to the balancing effect of this connection and the constant tendency of the forward axle to swing to a position parallel with cross-bar N when the vehicle is in motion.

In each block M of the axle is inserted each end of handle-bar G, which extends back of the body of the vehicle, with its ends extended downwardly and forwardly into the sockets. The handle-bar is adjustable up or down by means of the set-screws $t$ at each socket to suit the convenience of the person steering.

To the under side of the body H, whether it be the chair or the box, are secured the loop-springs I, one on each side, terminating in hooks I', which engage over the axle at M" and serve as supports for the body above. On the back side of the body are secured two bolts R, having pivotal openings transversely through the same, into which are inserted the ends $n$ of a link connection, consisting of a straight shank portion S and a downwardly-projecting loop S', to engage the handle-bar. To the middle of this part is secured a doubled piece of spring-wire, the same being folded over the loops S' at $a$ and extended forwardly at T, upwardly at T', and downwardly and outwardly at $a$ to engage between the shanks S of the main portion. Where the body is a chair, this device is secured to a bar P, which is retained to the chair by clip-bolts P' P' at each end. Where the body is a box, the bolts R are secured directly to the box. In placing the body upon the vehicle it is set upon its springs I, with the hooks I' over the axle at each end of bar M", and the link portion S S' is hooked under the central portion of the handle-bar G, and the keeper T T' is compressed together and closed down over the handle-bar and hooked under the shank portion S by the outwardly-extending hook portions $a$, thus forming a secure link connection to hold it in proper position for the body at that point, which can be easily detached. This makes the body easily removable and makes it possible to easily change the chair for the box or the box for the chair to suit the convenience of the user and also give free action to the springs.

This velocipede is especially adapted for use in connection with the chair. The chair is preferably made of suitable wicker-work or other light material. To the front thereof we secure a step K' on the end of suitable arms K, which are pivotally connected to downwardly-depending brackets J. The brackets J are best made of suitable straps of iron doubled at the bottom to form an eye and secured to the under side of the chair. From the step K a strap L at each end extends onto the seat of the chair, where it is suitably secured by buckles L' J'. The strap being adjustable through the buckle, it is possible to adjust the step E at any height or draw it up to the front of the chair, forming a suitable basket, which is well adapted to the uses of a baby-cab.

Having thus described specifically our improved velocipede, we desire to state that it is capable of great variation in its details without departing from our invention. It would be possible to apply the arm E in different relation to the other parts, so that it might not be necessary for them to cross in the form of a letter X. Both arms E are necessary to se- cure the proper action. It also might be possible to provide other styles of bearing than the ball-bearing shown in the journals M' N'; but the ball-bearings are much preferred on account of their overcoming to a greater extent than any other known means the friction at these points. It is needless to say that the handle-bar might be varied in its form and might connect to the different parts of the axle or machine and still serve its purpose very well. We are also aware that the principle of the steering construction is adapted to vehicles having four wheels or to vehicles having more than four wheels and do not wish to be confined in our claims specifically to a velocipede having only three wheels. The springs under the body might be omitted and the body be supported in other ways. It is also apparent that other styles of motor than the pedals and chain in common use on a safety-bicycle might be employed. In fact, any propelling means might be utilized in this connection that operates on the rear section of the machine and all the valuable features and advantages of our steering means be secured.

Other variations will no doubt suggest themselves to those skilled in the art to which our invention appertains.

Having thus described our invention, what we claim as new, and desire to secure by Letters Patent, is—

1. In a vehicle the combination of a rear section made up of parts like the rear of a safety-bicycle; a reach B', extending forwardly from the rear section; a cross bar or tube N, with vertical tubular bearing N', at each end secured to said reach; an axle made up of tube M'', and blocks M, at each end with suitable carrying-wheels at each end of the axle; connecting bars or tubes E, with journals E', at each end at right angles thereto one end of each for insertion in bearings N', and the opposite ends for insertion in bearings M', on the axle at the opposite side; suitable handle-bars G, in front of the saddle and extending downwardly and forwardly into sockets in blocks M, M, to control the same for steering purposes; a suitable body supported on the axle for the purpose specified.

2. In a velocipede the combination of a rear section made up of parts like the rear of a safety-bicycle; a reach B', extending forwardly from the rear section; a cross bar or tube N, with vertical tubular bearing N', at each end secured to said reach; an axle made up of tube M'', and blocks M, at each end with suitable carrying-wheels at each end; vertical bearing-tubes M', M', at each end of the axle; connecting bars or tubes E, with journals E', at each end at right angles thereto one end of each for insertion in bearings N', and the opposite ends for insertion in bearings M', on the axle at the opposite side; suitable handle-bars G, in front of the saddle and extending downwardly and forwardly into sockets in blocks M, M, to control the same for steering purposes for the purpose specified.

3. In a vehicle the frame carrying the driving-wheel and driving mechanism, and the axle carrying the steering-wheels, in combination with two swinging arms forming substantially an X-shaped cross, having their ends on one side hinged to the steering-axle and their opposite ends hinged to the frame carrying the driving mechanism substantially as and for the purpose specified.

4. In a vehicle the combination of a rear section; means of propelling the same; a forward section on suitable carrying-wheels; transverse arms pivoted at each side of the rear section and each arm extended transversely across and pivoted to the opposite side of the front section to form a swinging connection between the sections for the purpose specified.

5. In a vehicle the combination of a rear section; suitable means of propelling the same; an axle in front with suitable wheels thereon pivotally connected to the rear section; a handle-bar in front of said rear section the sides of which extend downwardly and forwardly and are adjusted in suitable sockets; a body with springs on its under side hooking over the axle; and a detachable link connection from the body to the handle-bar for the purpose specified.

6. In a velocipede-carrier the combination of the driving mechanism to the rear; an axle with suitable carrying-wheels thereon to the front; a suitable handle connected to said axle to guide the same; a chair with a foot-rest and step in front pivotally supported on said axle and means of securing the back of the chair as specified.

7. In a velocipede-carrier, the combination of the driving mechanism to the rear; an axle with suitable carrying-wheels thereon to the front; a suitable handle connected to said axle to guide the same; a chair with a foot-rest and step in front and spring beneath pivotally supported on said axle and means of securing the back of the chair to the handle-bar as specified.

8. In a vehicle the combination of a suitable axle or support; a body with hooks on its under side to rest thereon; a handle-bar extending upwardly and to the rear of said body; a link connection from the body to the handle-bar consisting of a main portion of wire the ends of which extend into suitable bearings and the body of which extends rearwardly and hooks under the handle-bar, and a keeper portion of spring-wire the middle of which is wrapped around the middle of the main portion to form a pivotal connection and the ends of which form upwardly-projecting loops for handling the same and then project downwardly and outwardly to engage the main portion as specified.

9. In a vehicle the combination of an axle or support; a body with springs under the same hooking over the axle; a handle-bar projecting upwardly from the axle; and a link connection between the body and the handle-bar for the purpose specified.

In witness whereof we have hereunto set our hands and seals in the presence of two witnesses.

MAURICE E. BLOOD. [L. S.]
  CLARENCE C. BLOOD. [L. S.]

Witnessess:
 W. S. WOOD,
 V. E. CHAPPELL.